United States Patent [19]
Crivellari et al.

[11] Patent Number: 6,091,726
[45] Date of Patent: Jul. 18, 2000

[54] DEVICE AND METHOD FOR HANDLING, ASSEMBLING AND TRANSMISSION OF DATA PACKETS

[75] Inventors: Paolo Crivellari, Antwerp; Frank Cyriel Michel DeFoort, Aartselaar, both of Belgium

[73] Assignee: Alcatel, Paris, France

[21] Appl. No.: 08/801,764

[22] Filed: Feb. 18, 1997

[30] Foreign Application Priority Data

Feb. 23, 1996 [EP] European Pat. Off. ............. 96200470

[51] Int. Cl.$^7$ ................................................. H04L 12/28
[52] U.S. Cl. ........................................... 370/392; 370/474
[58] Field of Search .................... 370/389, 392, 370/400, 401, 402, 403, 474, 395, 397, 475, 471

[56] References Cited

U.S. PATENT DOCUMENTS 5,515,359   5/1996   Zheng ........................................ 370/13

OTHER PUBLICATIONS

"Network–Interface–Unit to Set–Top Unit Interface", Lower Layer *Protocols and Physical Interfaces*, DAVIC 1.0, Ref. 4.1, Nov. 10, 1995, pp. 85–89.

*Primary Examiner*—Chi H. Pham
*Assistant Examiner*—Kim T. Nguyen
*Attorney, Agent, or Firm*—Ware, Fressola, Van Der Sluys & Adolphson LLP

[57] ABSTRACT

A device realizing a method for handling incoming data packets first forwards these data packets from a first unit towards a second unit, extracts within the second unit the header and user information, and performs a step of selecting and processing the header and user information thereby providing selected information in accordance with predetermined information. A selection of at least predetermined part of the selected information is followed by a step of looping back this at least predetermined part of the selected information from the second unit to the first unit. A device realizing a method for assembling and transmitting data packets first generates header and user information within a first unit, transmits this information towards a second unit, which further processes and assembles it to generate therefrom data packets. These are then transmitted back from the second unit via the first unit to an output terminal.

14 Claims, 2 Drawing Sheets

DEVICE AND METHOD FOR HANDLING, ASSEMBLING AND TRANSMISSION OF DATA PACKETS

BACKGROUND OF THE INVENTION

1. Technical Field

The present invention relates to a device and a method for handling incoming data packets and to a device and a method for assembling and transmitting data packets.

2. Description of the Prior Art

An arrangement combining such devices for realizing the related methods is already known in the art, e.g. from the DAVIC specification 1.0 Rev. 4.1 Part 08: "Lower Layer Protocols and Physical Interfaces", p 85–89, which relates to a set top box for, in one direction, receiving ATM cells on an input terminal coupled to an ATM input bus. This set top box includes a first unit denoted as network interface means unit, NIU, and a second unit denoted as set-top unit, STU. Both units are interconnected by means of an interface means consisting of several buses as can be seen from the figure on p 87 of the mentioned prior art reference. Among these buses a bi-directional Data bus serves to transport ATM-cells from the first unit towards the second unit whereas an I2C bus transports control information between the first unit and the second unit. The second unit STU further includes a module called "slow" SAR module intended for ATM layer and ATM-adaptation layer termination of the ATM cells entering the second unit. Part of this module thus corresponds to the information extraction unit mentioned in the preamble of claim 1 and which was adapted to extract user and header information of incoming data packets. However not all ATM-cells need to be terminated in this second unit STU. In the prior art solution some predetermined cells, being Physical Layer Operation And Maintenance cells related to the first unit NIU and ATM cells carrying MPEG stream, need to be terminated in this first unit. This is realized by the presence of another SAR module included within the first unit, denoted "fast" SAR on the fig on p 87 of the mentioned prior art reference. The function of this fast SAR module is similar to the function of the slow SAR module, except that this fast SAR module also performs a selection on the incoming ATM-cells, thereby selecting these predetermined cells for further ATM and ATM adaptation layer termination within the first unit, while sending all other incoming ATM cells except these predetermined cells, via the bi-directional Data bus towards the second unit.

SUMMARY OF THE INVENTION

It is evident that with this prior art approach two SAR modules are needed, which implies a duplication of this functionality, thereby resulting in a higher cost of the total device.

An object of the present invention is to provide a device realizing a method for handling data packets of the above known type, but wherein the duplication of the above mentioned functional blocks is avoided.

According to a first aspect of the present invention, a device comprising a first unit, a second unit and an interface means interconnecting said first unit and said second unit, said first unit responsive to incoming data packets having header information and user information, for providing said incoming data packets to said second unit via said interface means, said second unit including an information extraction unit for extracting said header information and said user information from said incoming data packets, is characterized in that said second unit includes an information-selection-processing subdevice coupled to said information extraction unit and responsive to said header information and said user information from said information extraction unit, for selecting and deriving therefrom information in accordance with predetermined information, thereby creating selected information, and for providing a selected information signal to said interface means via a bit selection module for selecting and providing at least predetermined part of said selected information to said first unit.

According to a second aspect of the present invention, a method for handling incoming data packets, said incoming data packets including header information and user information, said method including a step of forwarding said incoming data packets from a first unit to a second unit, and including a further step of extracting within said second unit said header information and said user information from said incoming data packets, is characterized in that said step of extracting is followed by a step of selecting and processing within said second unit said header information and said user information to thereby provide selected information in accordance with predetermined information, in that said step of selecting and processing is followed by a step of selecting at least predetermined part of said selected information and by a step of looping back said at least predetermined part of said selected information from said second unit to said first unit.

Indeed, since the information extraction is only performed in the second unit and no longer in the first unit, there is no longer a need for duplication. The selection of the predetermined data packets, as for instance NIU-related Physical Layer Operation And Maintenance cells in the prior art application, of which the information needs to reach the first unit, also takes place in the second unit. This occurs in an information-selection-processing subdevice, which now performs the cell selection functionality which is included in the "fast SAR", contained within the first unit of the prior art solution. At least part of the selected information derived from header and user information included within these predetermined data packets, is transferred back towards the first unit via the interface means. The determination of this part occurs in the bit selection module. In the prior art solution a block with comparable functionality was present in the first unit. The action of looping back part of the information from the second unit towards the first unit requires little extra functionality added to the second unit, being some extra messages between two existing controllers as will become clear from a further part of this description. Consequently the handling of the incoming data packets is in the present invention performed in only one unit instead of in both units, and this at the expense of only a little extra functionality, thus resulting in a simple and low cost device when compared to the prior art device.

An additional characteristic feature of the present invention is that said device for handling incoming data packets further includes a first control device included within said first unit and a second control device included within said second unit, said second control device being coupled between said interface means and said bit selection module, and with said first control device providing predetermined information to said second control device, at predetermined instances and which is needed for selecting the predetermined data packets. In case of handling of ATM-cells this predetermined information needed for selecting these predetermined data packets, consists of dedicated virtual path identifier and virtual channel identifier information.

In this way the handling of the incoming data packets is supervised by the first control device controlling the second control device. In the prior art solution both control devices were already present for performing other functions. The subject architecture thus avoids the need for extra control blocks, again resulting in a low cost solution, for these applications as the one of the prior art solution.

Still an additional characteristic feature of the present invention is that said interface means includes a first interface means and a second interface means each transporting specific data and coupled to the different blocks and units.

In this way an embodiment is realized in which a first interface means serves only to transport complete data packets, whereas a second interface means serves to transport messages between the two controllers. This is in accordance with existing specifications as also implemented in the prior art solution in which the bi-directional data bus may be considered equivalent to the first interface means and the I2C control bus equivalent to the second interface means. This means that in the subject device compatibility with existing prior art architectures and specifications is maintained, which is of course an asset since the subject device is thus compatible with existing hardware.

Yet another characteristic feature of the present invention is that said method is realized by means of a protocol initiated by a first message sent from said first control device to said second control device, said first message including said predetermined information, wherein receipt of said first message by said second control device activates said information-selection-processing subdevice by transmitting said predetermined information from said second control device to said information-selection processing-subdevice, wherein in case of correspondence between said predetermined information and part of said header information a second message including said at least predetermined part of said selected information is sent from said second control device to said first control device, and from which it becomes clear that only few extra instructions and messages are needed for executing the subject method in the subject device, again confirming that this device realizing the handling of incoming data packets is a simple and low cost device if compared to the prior art.

The prior art set top box, in the other direction, also assembles and transmits data packets, derived from part of header information and from user information being generated by the earlier mentioned first unit, and which is coupled to the ATM bus via an output terminal of this set top box. The earlier mentioned "slow" SAR module included within the earlier mentioned second unit has further functions such as segmentation of user information provided to this module, assembling the segmented user information together with part of header information and additional transmission information also provided to this module, into ATM cells, and delivering these assembled ATM-cells to the previously mentioned bi-directional data bus. Part of this slow SAR module corresponds to a prior art data packet assembling unit described below. The set top unit is also adapted for transmitting the ATM cells assembled within this slow SAR module, via the bi-directional data bus, towards the network interface unit, which transmits them further to an output terminal of the set top box. In this prior art device however only user information and header information generated within this set top unit are assembled in this slow SAR module. The user information and header information generated within the network interface unit are assembled in this network interface unit within the previously mentioned "fast" SAR module having additional functionality as the one mentioned for the "slow" SAR module. The ATM cells thus generated in this first unit are directly transmitted to the output terminal of the set top box. Again this solution implies the availability of two SAR modules, resulting in a duplication of this functionality and in a higher cost of the device.

Another object of the present invention is to provide a device realizing a method for assembling and transmitting packets of the above known type, but wherein the duplication of the above mentioned functional blocks is avoided.

According to a third aspect of the present invention, a device for assembling and transmitting data packets to an output terminal coupled to said device, said device including a first unit for providing user information and part of header information, said device including a second unit with a data packet assembling unit for assembling data packets and for providing said data packets via an interface means to said first unit, said first unit for providing said data packets provided to said first unit from said interface means to said output terminal, is characterized in that said first unit is for forwarding said user information and said part of said header information via said interface means to said data packet assembling unit and in that said data packet assembling unit is for deriving said data packets from said user information, from said part of said header information and from additional transmission information generated within said second unit.

According to a fourth aspect of the present invention, a method for assembling and transmitting data packets derived from part of header information and from user information generated within a first unit, is characterized in that said method includes a first step of transmitting said part of said header information and said user information from said first unit to a second unit, in that said method includes a further step of processing and assembling within said second unit said user information and said part of said header information together with additional transmission information generated within said second unit into said data packets, and in that said method includes a final step of transmitting back said data packets from said second unit to said first unit.

In this way a device is realized for assembling data packets derived from part of header information and from user information being generated within the first unit, but wherein the step of processing and assembling is realized in a data packet assembling unit included within the second unit. This device thus avoids the need for a second data packet assembling unit included within the first unit. In order to realize this, the part of the header information and user information generated within the first unit is sent from the first unit towards the second unit, but this only requires little extra effort and functionality as will become clear in a following part of this description. Thus a simple and low cost device is realized.

Another characteristic feature of the present invention is that said device for assembling and transmitting data packets further includes a first control device included within said first unit and a second control device included within said second unit.

In this way the routing of the part of the header information and the user information from the first unit towards the second unit is performed via two control devices. These control devices were already present in the prior art solution for other purposes. Therefore no extra functional blocks for controlling the subject method are required for applications as for instance the one mentioned in the prior art solution, this architecture thus again reducing cost.

Still an additional characteristic feature of the present invention is that said interface means includes a first interface means and a second interface means, said second interface means for transporting said user information and said part of said header information from said first unit to said second unit, said first interface means for transporting said data packets from said second unit to said first unit, wherein said first control device is connected with said second control device via said second interface means and wherein an output terminal of said second control device is coupled to said first interface means via said data packet assembling unit.

In this way an embodiment is realized in which a first interface means serves only to transport complete data packets, whereas the second interface means serves to transport controller messages. Since this is in accordance with existing specifications related to applications for which the device subject of the invention may be used, compatibility with existing systems is maintained again being an extra asset.

These and other objects, features and advantages of the present invention will become more apparent in light of the detailed description of a best mode embodiment thereof, as illustrated in the accompanying drawing.

DETAILED DESCRIPTION OF THE INVENTION

Figure 1:
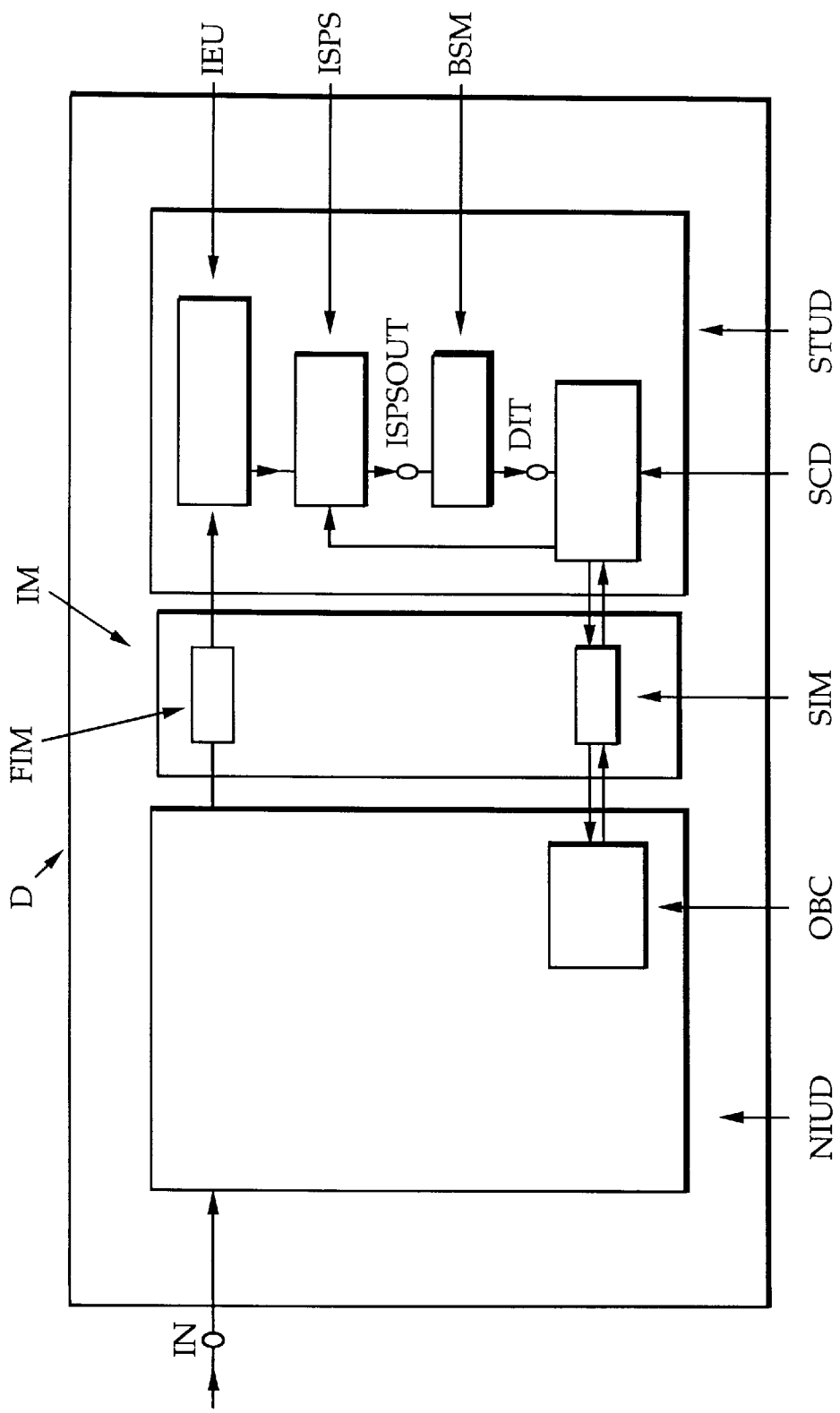
FIG. 1 shows a basic scheme of an embodiment of a device D for handling incoming data packets according to the invention.

The device D for handling data packets as described herein as well as the device DU for assembling and transmitting data packets as described herein are used in set-top boxes wherein both devices are combined.

A set top box is a user device located at the user premise supporting the following minimum set of functions in a full service network: interfacing with the currently existing television set, supporting the remote control of video play, decoding the MPEG video and audio stream, supporting the human interface means, and interfacing to the network. The minimum set of functionality to be supported by a set-top box is defined by several specifications of which the different versions of the Digital Audio-Visual Counsel, abbreviated with DAVIC, are the most important. In version 1.0, Part 08, of this DAVIC specification the lower layer protocols and physical interfaces are specified, whereas in revision 4.1 of this mentioned part of the DAVIC specification a block diagram of a set-top box is shown on p 87.

The device D as well as the device DU, both subject of the invention, conform to this specification as far as the main architecture and interfaces are concerned. This can be seen from FIG. 1 and from FIG. 2 showing that the device D as well as the device DU are composed of two main units: a first unit, denoted by NIUD and NIUU respectively, both being part of the Network Interface Means Unit which is the network dependent unit of the set-top box, and a second unit, denoted by STUD and STUU respectively, being part of the set-top unit being the network independent part of the set-top box, as described by the mentioned reference. This division results in a clean functional split between the first unit NIUD and NIUU respectively, and the second unit STUD and STUU respectively, since functions related to the physical layer occur in the NIUD and NIUU respectively, whereas functions related to the non-physical layer occur in the STUD and STUU, respectively, in accordance with the DAVIC specification. In the subject devices D and DU, the interface means, denoted by IM and IMU respectively, correspond to the A0 interface means as defined by DAVIC. This A0 interface itself consists of several buses as shown in the mentioned DAVIC reference. The same is true for the interface means IM and IMU respectively. In this respect the bi-directional data bus as mentioned in the DAVIC reference corresponds to the first interface means denoted FIM and FIMU respectively whereas the I2C Control bus as mentioned by the DAVIC reference then corresponds to the second interface means denoted by SIM and SIMU respectively.

As mentioned in a previous paragraph both devices D and DU are combined in set-top boxes. However, for the sake of clarity, they are now described here as two separate devices.

In the downstream direction the invention relates to the way incoming data packets provided to an input terminal IN, and containing specific information required by the first unit NIUD, are handled in the device D. In an embodiment according to the present invention these specific data packets are Physical Layer Operation And Maintenance ATM-cells, hereafter denoted by PLOAM-cells. In prior art solutions, as the one mentioned by the DAVIC spec 1.0 Rev 4.1 part 08,pp 85–89, these PLOAM-cells, were terminated in the network interface unit means by means of a specific module being part of this unit, denoted by "fast" SAR.

With the subject method however all incoming data packets are directly and transparently forwarded from the first unit NIUD to the second unit STUD via the first interface means FIM. All incoming data packets are then consecutively handled within the second unit STUD whereby first the header and user information contained within these data packets is extracted. This extracting step takes place in an information extraction unit IEU. In the subject embodiment where the incoming data packets consist of ATM-cells, this information extraction step corresponds to the ATM-layer termination of the incoming ATM-cells. Remark that this ATM termination is done for all incoming ATM-cells.

The header and user information thus extracted is needed for performing a step of selecting and processing of this information. This step of selecting and processing includes a step of selecting ATM-cells based on information contained within the thus extracted header information and on predetermined information. In the subject embodiment this information contained within the header corresponds to information contained within the virtual path identifier and virtual channel identifier locations, hereafter denoted by VPI/VCI information, whereas the predetermined information corresponds to a set of specific VPI/VCI bit combinations.

The step of selecting and processing is performed in an information-selection-processing subdevice ISPS which is coupled to the information extraction unit IEU. In the subject embodiment this information-selection-processing subdevice receives header and user information of the incoming ATM cells, extracted by the information extraction unit IEU, and consecutively selects predetermined ATM-cells by comparing the VPI/VCI information contained within received header information with the predetermined information consisting of the set of specific VPI/VCI values.

This predetermined information is provided to the information-selection-processing subdevice ISPS by a control device as will be explained in a later paragraph.

In case of correspondence of the VPI/VCI information contained within the header information of an incoming ATM-cell with one of the specific VPI/VCI combinations, the ATM-cell is selected and the information contained within this ATM-cell is further processed. This further processing consists of performing the ATM adaptation layer termination on the user information of this cell, thereby generating reassembled user information, after which step the thus processed user information, together with the original complete header information is put on an output terminal ISPSOUT of this information-selection-processing subdevice. The original header information of the selected cell, together with the reassembled user information of the selected cell are denoted selected information.

It has to be noted that other ways for performing the step of selecting and processing are possible. A more complex method than the just described one, consists of first performing the ATM-adaptation layer termination on the incoming user information that was extracted by the information extraction unit IEU, followed by a step of selecting the predetermined ATM-cells. This method however requires the use of special buffering means or the use of special identifiers in order to enable the selection of the specific PLOAM ATM-cells after the ATM-adaptation layer has been performed on the user information. In any case the same selected information, being the header information of the selected cell together with the reassembled user information, is put on an output terminal of the information-selection-processing subdevice ISPS. A person skilled in the art has the knowledge how to implement both methods in variant embodiments of the information-selection-processing subdevice. Therefore this will not be further described.

The step of selecting and processing is followed by a step of selecting at least predetermined part of the selected information. This step is performed in a bit selection module BSM coupled to the output terminal ISPSOUT of the information-selection-processing-subdevice ISPS, and which performs a selection of bits contained within the selected information. In the considered embodiment the predetermined part consists of the VPI/VCI header information of the selected cells, together with the reassembled user information.

Note that in an alternative embodiment the information-selection-processing subdevice and the bit selection module can be combined in one single module since the step of selecting is performed based on the same predetermined part of the header information as the one that is selected by the bit selection module. For other applications however it could be possible to provide another part of the ATM-cells at an output terminal of the bit selection module as the one used for selecting the ATM cells. In that case the information-selection-processing subdevice and the bit selection module have to be two separate devices.

Finally the step of selecting at least predetermined part of the selected information is followed by a step of looping back this at least predetermined part of the selected information from the second unit STUD towards the first unit NIUD. This means that the VPI/VCI information together with the reassembled user information of the selected PLOAM ATM-cells is transferred back to the first unit NIUD. This information is looped back from an output terminal of the bit selection module towards the first unit NIUD via two control devices which will be described in a later paragraph.

Figure 2:
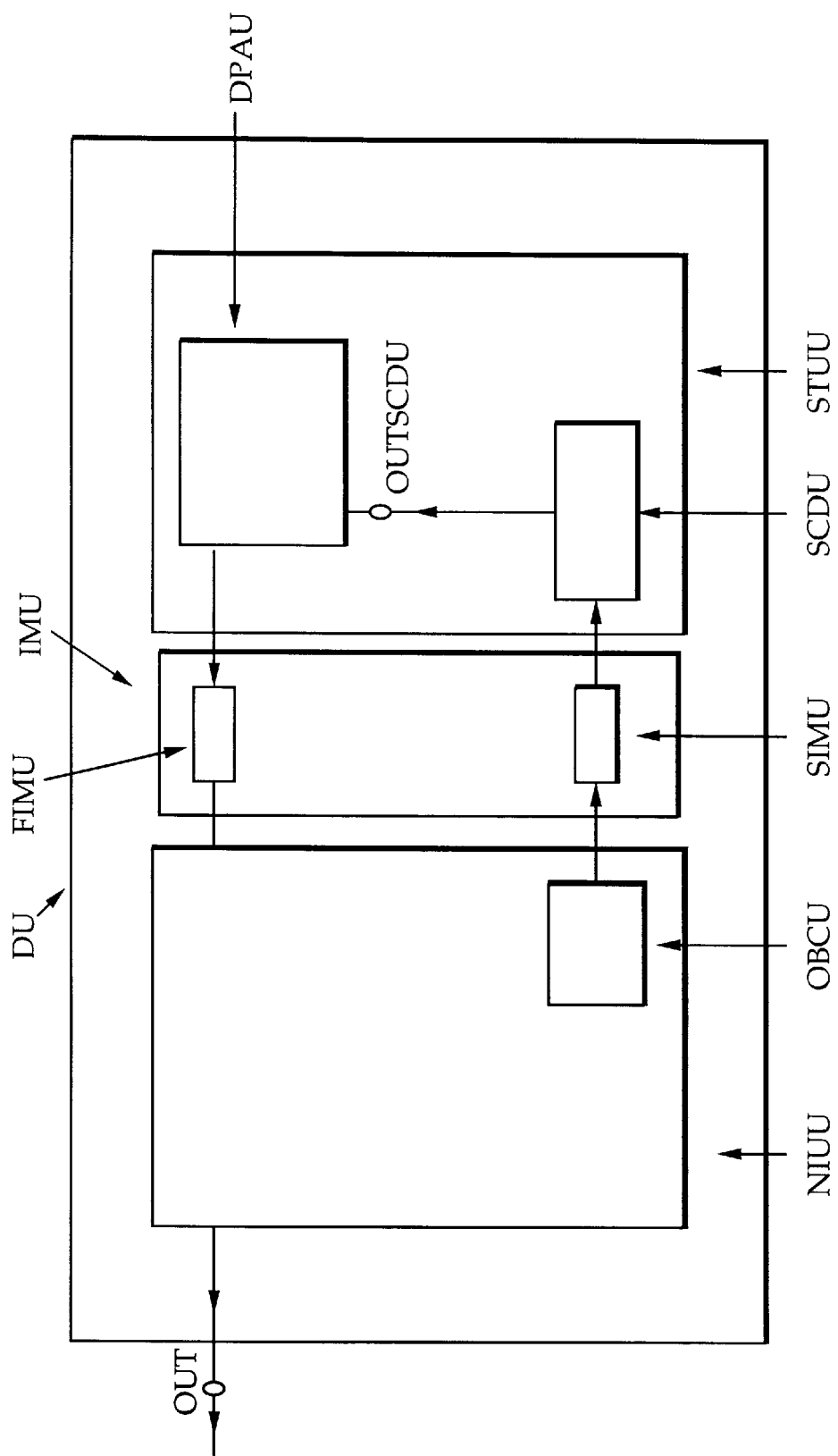
FIG. 2 shows a basic scheme of an embodiment of a device DU for assembling and transmitting data packets according to the invention.

The header information and user information of the non-selected ATM-cells are further passed to other parts of the set-top unit of the set-top box, which are not shown on FIG. 1 and which will not be further described here since they are not relevant to the invention. The information included in the non-selected cells is put on another output terminal of the information-selection-processing subdevice ISPS, which is not shown on FIG. 1, and which is connected to other parts of the set-top unit which are not shown either.

The above described method is realized by executing a set of instructions, on a first control device, OBC, included in the first unit NIUD, communicating with a second control device SCD, included in the second unit STUD. Both control devices are mutually communicating via the second interface means SIM. Note that in the set top box of which the device D forms part, both control devices were already incorporated for performing other functions, not directly related to the invention. These other functions will therefore not be further described. Both control devices OBC and SCD are also used for looping back the at least predetermined part of the selected information between the second unit STUD and the first unit NIUD, and for controlling the method.

An output terminal of the bit selection module BSM is therefore coupled to a data input terminal DIT of the second control device SCD. The at least predetermined part of the selected information is transferred from the bit selection module BSM via that data input terminal DIT towards the second control device SCD, and further towards the first control device OBC via the second interface means SIM.

The protocol for controlling the just described method will now be described. This protocol consists of a series of messages exchanged between the first control device OBC and the second control device SCD. A first message, initializing the method, is sent from the first control device OBC to the second control device SCD, and includes the following information: a predetermined initialization code, which can be unambiguously recognized by the second control device SCD, and one of the specific VPI/VCI combinations. In this case as many initialization messages as there are predetermined VPI/VCI combinations are to be sent from the first control device OBC to the second control device SCD. An alternative method can consist of sending one general initialization message including the same predetermined initialization code, followed by the complete set of all specific VPI/VCI combinations to be selected. This complete set then forms the predetermined information. This initialization message is sent by the first control device OBC towards the second control device SCD. Upon receipt of this initialization message the second control device SCD recognizes the initialization code, and sends the predetermined information via a control connection, which is not shown on FIG. 1, towards the information-selection-processing subdevice ISPS. This enables the information-selection-processing subdevice ISPS for performing its function which was described in a previous paragraph. Whenever an ATM-cell with one of the predetermined VPI/VCI combinations is selected and processed by the information-selection-processing-subdevice ISPS , the at least predetermined part of the selected information extracted by the bit selection module and consisting of VPI/VCI information together with the reassembled user information, is transferred towards the second control device SCD. The second control device SCD receives this information on its data input terminal DIT and consecutively puts it in a "downstream-cell" message, together with a second predetermined code, and sends this message to the first control device OBC. This second predetermined code is unambiguously reconizable by the first control device and informs the first control device that an ATM-cell with the appropriate VPI/VCI is detected, of which at least predetermined part of its header information and reassembled user information is put in the remainder of this "downstream-cell" message. The first control device OBC receives this message, recognizes the code and extracts from the message the VPI/VCI information and the reassembled user information of the PLOAM ATM-cells for further use within the first unit NIUD.

It has to be remarked that the subject method may be realized requiring only one of the above mentioned control devices, namely only one control device included within the second unit. It is known to a person skilled in the art how to control such a method as the one described above, using only one control device included in the second unit. This will therefore not be further described.

The present invention also relates to the way part of header information and user information generated within a first unit NIUU, included within the device DU, is assembled into data packets and transmitted, in the upstream direction, to an output terminal OUT of this device DU. In an embodiment according to the present invention the subject data packets to be assembled are again PLOAM cells, of which the VPI/VCI information, as well as the user information are generated in a first control device OBCU included within this first unit NIUU. A second control device SCDU is included within the second unit STUU and both control devices OBCU and STUU are communicating via the second interface means SIMU. The user information and the VPI/VCI part of the header information generated within the first control device OBCU of the first unit NIUU is transmitted to the second control device SCDU included in the second unit STUU via the second interface means SIMU. In this second unit STUU a data packet assembling unit DPAU is coupled to an output terminal OUTSCDU of the second control device SCDU. This second control device SCDU receives the user information and part of the header information from the first control device OBCU, and delivers this information to the data packet assembling unit DPAU. This data packet assembling unit DPAU then generates from this information and from additional transmission information generated within the second unit complete data packets. The data packet assembling unit DPAU therefore first performs the segmentation of the user information, thereby creating segmented user information, after which the assembly of the segmented user information with the VPI/VCI information and with the additional transmission information into ATM-cells is performed. The thus generated ATM-cells are then provided by the data packet assembling unit DPAU to the first unit NIUU via the first interface means FIMU. The first unit NIUU then further transmits these ATM-cells further towards the output terminal OUT of the device DU.

Again the control of the method is performed by means of a special protocol between both controllers. In this case this protocol consists of only one message sent from the first control device OBC towards the second control device SCD. This "upstream cell" message includes a third predetermined code unambiguously recognizable by the second control device, together with the user information and the VPI/VCI information. Upon receipt of this "upstream cell" message the second control device forwards the received information towards the data packet assembling unit DPAU, which then further assembles this information into ATM-cells and delivers these ATM-cells towards the first unit NIUU via the first interface means FIMU. The further transmission of the cells towards the output terminal OUT is not controlled by this message since this functionality of the first unit NIUU already existed in the prior art solution referred to in a previous paragraph.

It has to be remarked that, as was the case for the upstream direction, in an alternative embodiment the method may be controlled by means of only one control device.

A further remark is that, although the invention has been described by means of an embodiment used in a set-top box, the subject methods and device may also be used in other applications of data communications.

While the principles of the invention have been described above in connection with specific apparatus, it is to be clearly understood that this description is made only by way of example and not as a limitation on the scope of the invention.

What is claimed is:

1. Network termination device (D) comprising a first, network-interface-unit (NIUD) for handling network-dependent functions, a second unit (STUD) for handling network-independent functions and an interface means (IM) interconnecting said first unit (NIUD) and said second unit (STUD), said first unit (NIUD) responsive to incoming data packets having header information and user information, for providing said incoming data packets to said second unit (STUD) via said interface means (IM), said second unit (STUD) including an information extraction unit (IEU) for extracting said header information and said user information from said incoming data packets, characterized in that said second unit includes an information-selection-processing subdevice (ISPS) coupled to said information extraction unit (IEU) and responsive to said header information and said user information from said information extraction unit (IEU), for selecting and deriving therefrom information in accordance with predetermined information, thereby creating selected information, and for providing a selected information signal to said interface means (IM) via a bit selection module (BSM) for selecting and providing at least predetermined part of said selected information to said first unit (NIUD).

2. Device according to claim 1 characterized in that said first unit (NIUD) further includes a first control device (OBC) connected via said interface means (IM) with a second control device (SCD) included in said second unit (STUD), said first control device (OBC) for controlling said second unit via said second control device (SCD).

3. Device according to claim 2 characterized in that said bit selection module (BSM) is coupled to said interface means (IM) via said second control device (SCD), said second control device (SCD) for providing said at least predetermined part of said selected information to said first control device (OBC).

4. Device according to claim 3 characterized in that said first control device (OBC) is for providing said predetermined information to said second control device (SCD) at predetermined instances.

5. Device according to claim 1 characterized in that said interface means (IM) includes a first interface means (FIM) and a second interface means (SIM), said first interface means (FIM) for transporting said incoming data packets from said first unit (NIUD) towards said second unit (STUD), said second interface means (SIM) for transporting said at least predetermined part of said selected information from said second unit (STUD) to said first unit (NIUD).

6. Device according to claim 5 characterized in that a first control device (OBC) included in said first unit (NIUD) is connected with a second control device (SCD) included in said second unit (STUD) via said second interface means (SIM) and in that said bit selection module (BSM) is coupled to said second interface means (SIM) via said second control device.

7. Method for handling incoming data packets in a network termination device, said incoming data packets including header information and user information, said method including a step of forwarding said incoming data packets from a first, network-interface-unit for handling network-dependent functions to a second unit for handling network-independent functions, and including a further step of extracting within said second unit said header information and said user information from said incoming data packets, characterized in that said step of extracting is followed by a step of selecting and processing within said second unit said header information and said user information to thereby provide selected information in accordance with predetermined information, in that said step of selecting and processing is followed by a step of selecting at least predetermined part of said selected information by a step of looping back said at least predetermined part of said selected information from said second unit to said first unit.

8. Method according to claim 7, characterized in that said method is initiated by a first message sent from a first control device (OBC) included in said first unit to a second control device (SCD) included within said second unit, said first message including said predetermined information, in that receipt of said first message by said second control device (SCD) activates said information-selection-processing sub-device (ISPS) included in said second unit, by transmitting said predetermined information from said second control device (SCD) to said information-selection-processing-subdevice (ISPS), in that said step of selecting and processing includes a comparison step between said predetermined information and part of said header information, whereby in case said predetermined information matches said part of said header information, a second message including said at least predetermined part of said selected information is sent back from said second control device (SCD) to said first control device (OBC).

9. Network termination device (DU) for assembling and transmitting data packets to an output terminal (OUT) coupled to said device (DU), said device (DU) including a first, network-interface unit (NIUU) for handling network-dependent functions and for providing user information and part of header information, said device including a second unit (STUU) for handling network-independent functions with a data packet assembling unit (DPAU) for assembling data packets and for providing said data packets via an interface means (IMU) to said first unit (NIUU), said first unit (NIUU) for providing said data packets provided to said first unit (NIUU) from said interface means (IMU) to said output terminal (OUT), characterized in that said first unit (NIUU) is for forwarding said user information and said part of said header information via said interface means (IMU) to said data packet assembling unit (DPAU) and in that said data packet assembling unit (DPAU) is for deriving said data packets from said user information, from said part of said header information and from additional transmission information generated within said second unit (STUU).

10. Device according to claim 9 characterized in that said first unit (NIUU) further includes a first control device (OBCU) for generating said user information and said part of said header information and connected via said interface means (IMU) with a second control device (SCDU) included in said second unit (STUU), said first control device (OBCU) further for controlling said second unit via said second control device (SCDU).

11. Device according to claim 10 characterized in that said interface means (IMU) includes a first interface means (FIMU) and a second interface means (SIMU), said second interface means for transporting said user information and said part of said header information from said first unit (NIUU) to said second unit (STUU), said first interface means (FIMU) for transporting said data packets from said second unit (STUU) to said first unit (NIUU), in that said first control device (OBCU) is connected with said second control device (SCDU) via said second interface means (SIMU) and in that an output terminal (OUTSCDU) of said second control device is coupled to said first interface means via said data packet assembling unit (DPAU).

12. Method for assembling and transmitting data packets derived form part of header information and from user information generated with in a first unit of a network termination device for handling network-dependent functions, characterized in that said method includes a first step of transmitting said part of said header information and said user information from said first unit to a second unit of the network termination device for handling network-independent functions, in that said method includes a further step of processing and assembling within said second unit said user information and said part of said header information together with additional transmission information generated within said second unit into said data packets, and in that said method includes a final step of transmitting back said data packets from said second unit to said first unit.

13. Method according to claim 7 characterized in that said incoming data packets consist of ATM-cells, in that said predetermined information consists of at least one predetermined virtual path identifier and virtual channel identifier information, in that said selected information consists of reassembled user information together with header information contained within ATM-cells having said predetermined virtual path identifier and virtual channel identifier information, in that said at least predetermined part of said selected information consists of virtual path identifier and virtual channel identifier information included within said header information of said selected information together with said reassembled user information contained within said selected information.

14. Method according to claim 12 characterized in that said part of said header information consists of virtual path identifier and virtual channel identifier information, in that said step of processing and assembling includes a step of segmentation of said user information, thereby creating segmented user information, and a further step of assembling said segmented user information together with said part of said header information and with said additional transmission information into ATM-cells.

* * * * *

UNITED STATES PATENT AND TRADEMARK OFFICE
CERTIFICATE OF CORRECTION

PATENT NO. : 6,091,726  
DATED : July 18, 2000  
INVENTOR(S) : P. Crivellari et al.

Page 1 of 1

It is certified that error appears in the above-identified patent and that said Letters Patent is hereby corrected as shown below:

Column 10,
Line 66, (claim 6, line 1), please cancel "5" and substitute -- 2 -- therefor.

Column 12,
Line 23, (claim 12, line 2), after "derived", please cancel "form" and substitute -- from -- therefor.

Signed and Sealed this

Eighteenth Day of September, 2001

*Attest:*

NICHOLAS P. GODICI  
*Attesting Officer*     *Acting Director of the United States Patent and Trademark Office*